(12) United States Patent
Dzengeleski et al.

(10) Patent No.: US 6,824,679 B1
(45) Date of Patent: Nov. 30, 2004

(54) HOLLOW FIBER SEPARATION MODULE AND METHODS FOR MANUFACTURING SAME

(75) Inventors: Stephen Dzengeleski, Arlington, MA (US); Steven R. Pearl, Hollis, NH (US); Ralf Kuriyel, Boston, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 09/807,592

(22) PCT Filed: Dec. 17, 1999

(86) PCT No.: PCT/US99/30141

§ 371 (c)(1),
(2), (4) Date: May 23, 2001

(87) PCT Pub. No.: WO00/35567

PCT Pub. Date: Jun. 22, 2000

Related U.S. Application Data
(60) Provisional application No. 60/112,647, filed on Dec. 17, 1998.

(51) Int. Cl.[7] .............................................. B01D 63/10
(52) U.S. Cl. ............................. 210/497.1; 210/321.83; 210/500.23; 156/169; 156/173
(58) Field of Search ........................ 210/321.74, 321.78, 210/321.79, 321.8, 321.83, 321.87, 321.88, 321.89, 488, 497.1, 500.23; 156/169, 173, 175

(56) References Cited

U.S. PATENT DOCUMENTS

| | | | |
|---|---|---|---|
| 4,348,458 A | | 9/1982 | Otstot |
| 4,622,086 A | | 11/1986 | Puck et al. |
| 4,631,128 A | | 12/1986 | Coplan et al. |
| 4,838,970 A | | 6/1989 | Thibos |
| 5,626,758 A | * | 5/1997 | Belfort .................. 210/636 |

OTHER PUBLICATIONS

Supplemental European Search Report, EP 99 96 7397 (dated Mar. 7, 2003).
Guigui, C., et al., "The Use of Dean Vortices in Coiled Hollow–Fiber Ultrafiltration Membranes for Water and Waste–Water Treatment", *DESALINATION*, Vol. 118, No. 1–3 (Sept. 20, 1998), pp. 73–80.
Mallubhotia, H., et al., "Flux Enhancement during Dean Vortex Tubular Membrane NanoFiltration", *Jnl. Memb. Sci.*, vol. 141, No. 2 (Apr. 15, 1998), pp. 183–195.

* cited by examiner

*Primary Examiner*—John Kim
(74) *Attorney, Agent, or Firm*—John Dana Hubbard

(57) ABSTRACT

The present invention provides methods for producing single and multi-layered coiled hollow fiber bundles for use in separation modules whose performance can be predicted, said modules being designed to take advantage of the benefits of Dean vortices. The present invention is also directed to multi-layered coiled hollow fiber bundles for use in separation modules that are directly scalable because each layer performs substantially equivalently to the other layers when subjected to a fluid of a certain velocity such that Dean vortices are created.

4 Claims, 11 Drawing Sheets

| Type | Area | # of fiber layer | Shell Length "L"(in.) | Shell O.D. (in.) | # of fibers/ Device | Fiber Length (in) | Equiv. Dean # (@ 2psi) |
|---|---|---|---|---|---|---|---|
| Lab Scale | 120 sq.cm | 1 | 11.5 | .75 | 4 | 38 | 203 |
| Pilot Scale | 1200 sq.cm | 3 | 23 | 1.1 | 40 | 35 | 210 |
| Process Scale | 1 sq.cm | 11 | 23 | 2.4 | 300 | 37 | 110 |
| | 2 sq.cm | 16 | 23 | 2.9 | 590 | 37 | 204 |

*assumes fiber 1.3mm ID xx2mm OD

HOLLOW FIBER SEPARATION MODULE AND METHODS FOR MANUFACTURING SAME

This application is a 371 of PCT/US99/30141 filed Dec. 17, 1999 which claims the benefit of U.S. Provisional Pat. App. Ser. No. 60/112,647, filed Dec. 17, 1998.

BACKGROUND OF THE INVENTION

The present invention relates to filtration modules or elements, and in particular to a new and useful method of producing multi-layer hollow fiber filtration modules. Moreover, the present invention provides a method of producing a variety of multi-layer hollow fiber filtration modules that have performance results that have a predictable performance such that the modules are directly scalable. Specifically, the present invention is directed to an improvement of the invention described in U.S. Pat. No. 5,626,758 hereinafter "the Belfort patent"), incorporated herein by reference in its entirety.

Vortices are well known in the art. Both Taylor and Dean vortices have been harnessed to improve the performance of pressure driven membrane processes. See Winzeler, H. and Belfort, G., "Enhanced performance for pressure-driven membrane processes: the argument for fluid instabilities", J. Membrane Sci., 80. 35–47 (1993). Moreover, such vortices have been harnessed with curved tubular membranes. See Srinivasan, S. and Tien, C. "Reverse osmosis in a curved tubular membrane duct", Third International Symposium on Fresh Water from the Sea, Vol. 2, pp. 587–600 (1970). The Belfort patent is directed to harnessing Dean vortices in curved hollow fiber membranes to reduce polarization and fouling at the membrane surface, thereby increasing the efficiency of the membrane module.

Dean vortices are formed in curved conduits under laminar flow conditions when the Dean number of the fluid is above a critical Dean number. Vortices exist in turbulent flow, but such vortices are chaotic and excessive pumping energy and/or large diameter tubes are required to generate them. The physical cause behind the formation of the vortices is the centrifugal force exerted on the fluid elements as the liquid flows around the curved surface. This results in the radial motion of the fluid elements in the plane transverse to the principal direction of the flow and the final formation of vortices in that plane. FIG. 1 provides an illustration of Dean vortices in a curved fluid tube, such being known to the prior art.

The Belfort patent is directed to the use of Dean vortices in curved hollow fibers to obtain filter modules with unique performance attributes. The Belfort patent discloses the use of a curved fluid tube constructed to form Dean vortices to improve filtration. The Belfort patent improved upon other prior art modular designs for pressure-driven membrane processes, such as reverse osmosis, and ultrafiltration that were based on maximizing membrane area per unit volume and on the handling convenience of the module.

Indeed, the Belfort patent adds to the many pre-existing methods for reducing concentration polarization ("CP") and fouling, including chemical modification of the membrane surface and physical methods such as scouring. Hydrodynamic methods are also known which rely on eddies during turbulent flow, or induced flow instabilities. Introducing inserts into the flow path can create such induced flow instabilities.

Many of these methods were discussed in the paper by George Belfort entitled, "Fluid mechanics in membrane filtration: recent developments", J. Membrane Sci., 40, 123–147 (1989). However, these prior art methods, as well as the Belfort patent, fail to provide guidance on producing Dean vortices-producing filtration modules that are directly scalable.

The Belfort patent teaches multi-layered modules. See FIG. 14 of the. Belfort patent. However, it fails to provide any teaching on manufacturing Dean vortices-producing filtration modules that are directly scalable.

In view of the teachings of the Belfort patent, one of ordinary skill in the art would recognize that a pilot or process module, as opposed to a lab scale module, would either require multiple layers of hollow fibers to handle the increased fluid flow, an implausibly long cartridge with fibers wrapped around a single mandrel or a very wide cartridge that has a low packing density with multiple single-layered fiber wrapped mandrels sealed into a tubesheet. However, as with other prior art uses of flow instabilities, the Belfort patent fails to teach those of skill in the art the ability to directly scale up a lab module to a multi-layered pilot or process (manufacturing) module without requiring significant trial and error. The Belfort patent merely suggests that the invention is amenable to such scaling.

The present invention provides Dean vortices-producing multi-layer filtration modules that are directly scalable. Specifically, the present invention provides methods that use a performance characteristic to develop substantially directly scalable multi-layer filtration modules for filtering solutions that benefit from the de-fouling properties of Dean vortices. More specifically, the present invention includes using a mathematical relationship of Dean number and shear rate to predict the performance of individual layers within a multi-layered module of curved hollow fibers. The present invention allows for performance of each layer within a multi-layered module to be designed to be substantially equivalent (defined below). The present invention describes the means of producing such multi-layered modules.

SUMMARY OF THE INVENTION

The present invention is directed to Dean vortices-producing multi-layered filtration modules and methods of designing such modules. Such modules are characterized by each layer having a substantially equivalent performance characteristic. This characteristic allows for the construction of filtration modules that are directly scalable. This is a substantial improvement over the prior art as it allows one to predict the performance of an eleven-layer module, for example, based upon the performance characteristics of a one-layer module.

As provided above, the present invention is also directed to methods of producing the multi-layered filtration modules using a performance characteristic. This performance characteristic is computed via a mathematical function including the Dean number and shear of a liquid. In determining this performance characteristic, the inventors have discovered a means for accurately and precisely estimating the performance of one or more layers of hollow fiber tubing in a filter module designed to use Dean vortices to de-foul the inner surface of the membrane. The inventors can then create subsequent layers having substantially equivalent performance by manipulating one or more of the characteristics of the hollow fiber to be used in such a module. Such hollow fiber characteristics that are contemplated for manipulation include the inner diameter, outer diameter, wall thickness, length, pore size and symmetry of the membrane. Of course, the composition of the hollow fiber can also be adjusted, that is the polymer or polymers used to create the hollow fiber.

For purposes of this invention, the phrase "de-foul" or "de-fouling" means the removal of species retained on the surface of a hollow fiber including, but not limited to solutes, particulate matter and gels. Inherent with such "de-fouling" is that solutions which tend to polarize become less polarized.

While it is within the present invention to produce a multi-layered filtration module with layers of hollow fibers comprised of different materials, this is not preferred. Moreover, it is even less expensive to produce a module of the present invention with fibers of the same material and having the same internal diameter and external diameter. Shortening the fiber length of the hollow fibers used in the subsequent fiber layer of the filter module to produce layers having substantially equivalent performance is the preferred means of producing the filtration modules of the present invention.

The present invention is particularly adapted for use with polarized solutions, preferably polarized aqueous solutions, and therefore includes methods of producing multi-layer filtration modules that use Dean vortices to remove deposits, remove suspended dissolved matter near the membrane and/or direct solutes away from membrane surfaces, the performance of such modules being able to be scaled directly with devices that have different numbers of layers. It is contemplated that the present invention may be used with non-polarized solutions.

With respect to the number of layers, one would preferably make available to customers needing to filter their polarized solvents, it is preferable to produce a three-layer module for pilot scale applications. With respect to process scale applications, eleven-layer modules have been found to be appropriate by the inventors. In addition, it is contemplated that process scale modules will comprise a plurality of multi-layered fiber bundles.

However, the present invention contemplates modules that have four to ten layers or modules with greater than eleven layers. The inventors recognize that with certain applications, it may be desirable to have process-scale modules that are longer than those set forth in the examples below. In such circumstances, fewer layers may be needed.

The multi-layer separation modules of the present invention are deemed to be particularly useful for the different types of filtration that are currently practiced by those of ordinary skill in the art: reverse osmosis, nanofiltration, ultrafiltration, diafiltration, clarification, pre-filtration, microfiltration and the like. The present invention is further contemplated for gas transfer to or from liquids. One use would be the oxygenation of blood. The Dean vortices would enhance transport of the gas to the liquid by reducing the liquid-side mass transfer resistance. The Dean vortices would also enhance any anti-thrombogenetic properties of the membrane surface. The present invention, since it teaches the ability to produce membrane modules that have predictable performance, would have substantial benefits in the oxygenation of blood during heart surgery as the module to module performance would be very consistent and thereby pass the strict FDA requirements for such products. It may also allow for use of less expensive but more porous membrane, such a polyethersulfone, as the Dean vortices can minimize the absorption of blood components to the membrane wall.

The inventors further recognize that the present invention may be useful for heretofore-undiscovered genera of filtration.

With respect to reverse osmosis (RO), it is generally used for separation of salt and low molecular weight organic matter from the liquid carrier. It is contemplated that the present invention will be useful for general RO applications as well as specific applications such as desalination and purification of brackish water and seawater. Another potential use is to desalinate potable water for production of water for injection. The benefit of the present invention for these applications is the minimization of pre-treatment steps, both chemical and physical, prior to RO filtration.

With respect to nanofiltration (NF), it is generally used for fractionation of salt and low molecular weight organic matter. It is contemplated that the present invention will be useful for general NF applications as well as specific applications such as antibiotics processing. This technology, in combination with the appropriate NF hollow fiber, could be used for softening of residential water. Diafiltration would be appropriate for a de-salting or solvent exchange as well with a nanofiltration hollow fiber.

With respect to ultrafiltration (UF), it is generally used for fractionation of medium molecular weight organic matter and transport of salt and low molecular weight organic matter. It is contemplated that the present invention will be useful for general UF applications as well as specific applications such as albumin purification. Another use of ultrafiltration and the present invention is for recovering electrophoretic paint from post-application rinses. Electrophoretic paint is expensive but has substantial performance attributes. Electrophoretic paints can be economically used only if the rinse mixture, created after the painted car is rinsed, is concentrated and the paint removed and reused. This is a highly fouling process and use of a module of the present invention would reduce the amount of fouling and enhance the periodic cleaning of the ultrafiltration module.

With respect to microfiltration (MF), it is generally used for retention of colloids, and other small particles and transport of salt, low molecular weight organic matter and other dissolved organic matter and solutes. It is contemplated that the present invention will be useful for general MF applications as well as specific applications such as cell processing whereby cellular debris is retained but the desired protein is transported through the module. It is further contemplated that the present invention will be useful for vaccine processing, specifically for removal of virus particles and/or cell debris.

In addition to the other MF applications set forth above, it is also contemplated that the present invention will be useful for transgenic milk clarification in which milk colloidal components or micelles are separated from milk proteins and enzymes.

A further MF application contemplated for the present invention is protein precipitate clarification, especially after the protein re-folding processes. Another object of the present invention includes the clarification of a variety of cell broths including lysed cell broths. An object of the present invention would include the clarification of mammalian cell broths such as Chinese hamster ovary ("CHO") cell broths, yeast cell broths and bacterial cell broths such as *E. coli*.

Preferably, modules of the present invention will be used for the above MF applications or other applications. With respect to ME applications, it is contemplated that the modules of the present invention would be particularly suited for cellular and colloidal clarification.

With respect to UF applications, it is contemplated that the modules of the present invention may be adapted for high performance tangential flow filtration ("HPTFF") for protein fractionation. HPTFF is described in U.S. Pat. Nos. 5,256,294 and 5,490,937, and the subject matter disclosed therein is incorporated herein by reference in its entirety.

Other separation processes that would benefit from the present invention includes gas separation membrane processes. This would be particularly useful for high flux, highly permeable membranes where the concentration polarization could occur. During gas separation, a concentration gradient builds at the boundary layer. The Dean vortices would prevent the gradient from occurring, thereby increasing flow of gas across the membrane.

With respect to the design of modules, the present invention allows for adjustment of the mandrel length and diameter to suit the desired performance characteristics. Moreover, the winding angle of the hollow fiber may also be adjusted to create or eliminate gaps on the mandrel. Preferably, there are no gaps between the hollow fibers.

Moreover, the present invention provides guidance on selecting the number of fibers one would want to wind, a "bundle", around the mandrel at one time. Furthermore, the present invention even allows the module manufacturer to pre-determine the amount of the mandrel that should be potted, the length of the fibers to be cut for each layer and the number of mandrel units, a mandrel with a specific number of layers and fiber characteristics, that one would want to combine to create a process-scale device.

A further object of the present invention includes the removal of agglomerations and gels from chemical-mechanical planarization ("CMP") slurries used in producing semiconductors.

A further object of the present invention is to provide a compact, relatively short filtration module. This is accomplished, in part, by the fiber bundle of the present invention having a high packing density. A shorter filtration module can be designed more easily by using multiple mandrel units in a single module.

The various features of novelty that characterize the present invention are pointed out with particularity in the claims annexed to and forming a part of this disclosure. For a better understanding of the invention, its operating advantages and specific objects attained by its uses, reference is made to the accompanying drawings, descriptive matter and examples in which the preferred embodiments of the invention are illustrated. As it will be realized, the invention is capable of other different embodiments, and its several details are capable of modifications in various, obvious aspects all without departing from the invention. Accordingly, the drawing and the descriptions will be regarded as illustrative in nature and not as restrictive.

DETAILED DESCRIPTION OF THE INVENTION

Figure 1:
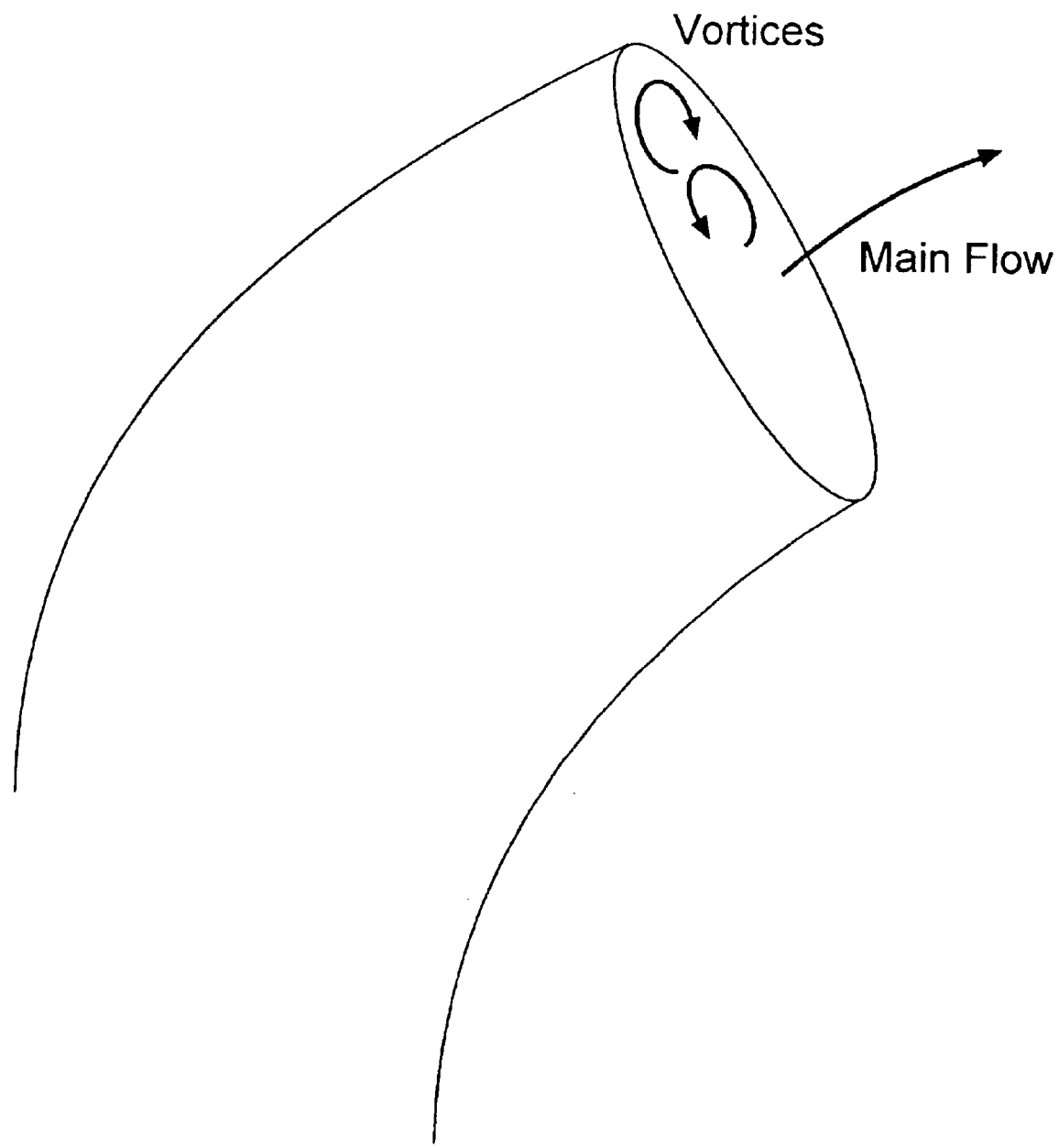
FIG. 1 is a cartoon that illustrates the prior art concept of Dean vortices in a curved fluid channel.

The present invention provides a substantial improvement over the prior aft; the ability to design coiled hollow fiber separation modules that have a predetermined performance output for each layer. Specifically, the inventors have devised an algorithm that allows for the design of a multi-layered hollow fiber module that has a predetermined output for each layer. This invention allows for one to design pilot and process scale multi-layered hollow fiber modules that are directly scalable from a single layered coiled hollow fiber separation module. This is because the performance output of each layer subsequent to the first can be pre-determined algorithmically using the performance data from the single layered module.

The present invention also provides a method of predicting the performance output of single-layered coiled hollow fiber separation modules, as the only variable that is not quantified algorithmically is the effect the specific membrane, i.e. pore size, polymer, asymmetry has on performance.

The present invention also provides a process of empirically designing a coiled hollow fiber separation module.

The present invention provides a multi-layered coiled hollow fiber bundle for use in a separation module, the bundle comprising a plurality of coiled hollow fibers, whereby the plurality of hollow fibers are arranged so as to create at least two layers that form the outline of concentric circles, each layer of said bundle designed to perform substantially equivalently to the other layer or layers when the bundle is part of a separation module and subjected to a fluid of a certain velocity such that Dean vortices are created. Preferably, the hollow fiber bundle is part of a separation module. Preferably, the hollow fibers in the bundle have substantially identical structure and polymeric components. In a preferred embodiment, the plurality of hollow fibers are arranged so as to create at least two layers that form the outline of concentric circles, each of the at least two layers independently characterized by a set of variables, these variables including the hollow fiber's outer and inner diameter, the number of fibers, the angle of coiling said fibers and the length of said fibers.

For purposes of the present invention, the phrase "hollow fibers in the bundle have substantially identical structure and polymeric components", means that the hollow fibers all consist of the same material and the structure of the hollow fiber, be it asymmetric, symmetric, void-less or replete with voids, for example, is the same. This definition takes into consideration the embodiment of the present invention where the internal and/or external diameters of the hollow fibers are altered from one layer to the next.

In another preferred embodiment of the present invention, all hollow fibers in the bundle have a substantially identical composition. Preferably, each layer of the hollow fiber bundle is independently characterized by a set of variables including the number of fibers, the angle of coiling said fibers and the length of said fibers.

For purposes of the present invention, the phrase "hollow fibers in the bundle have a substantially identical composition" means that the hollow fibers used in the fiber bundle all consist of the same material, the structure of the hollow fiber, be it asymmetric, symmetric, void-less or replete with voids, for example, is the same and the internal and external diameters of all the hollow fibers are the same.

In another preferred embodiment of the present invention, each of the at least two layers of hollow fibers are characterized by a set of variables including the length of a mandrel around which the fiber bundle will be coiled, the diameter of the mandrel and the number of the hollow fibers for each layer. In order to minimize gaps between fibers, for a given fiber diameter, a preferred number of fibers and preferred angle of are selected.

In a preferred embodiment of the present invention, the fibers are arranged so as to maximize the packing density of the fibers in a module in which the fibers would be used.

In another preferred embodiment, this fiber bundle is housed in a filtration module. Preferably, the fiber bundle is coiled around a mandrel. With respect to the direction of coiling, it is preferable that the direction of coiling alternate from layer to layer. It is contemplated that layering in this manner will, while lessening packing density, will improve the flow of solute across the hollow fiber membranes.

The present invention provides a method for producing a multi-layered coiled hollow fiber bundle that is directly scalable from a single layer coiled hollow fiber bundle, the bundles for use in separation modules, whereby the hollow fibers used have substantially identical structure and polymeric components, the method comprising determining a performance parameter from a single layer coiled hollow fiber bundle, the single layer coiled hollow fiber filter bundle including hollow fibers that have substantially identical structure and polymeric components, when contained in a filtration module and subjected to a fluid of a certain velocity such that Dean vortices are created; calculating the needed value of the variables for each additional layer so each additional layer would produce a performance parameter substantially equivalent to that of the first layer when the bundle is part of a filtration module and subjected to the fluid of the certain velocity; and producing a multi-layered coiled hollow fiber bundle that incorporates the calculated variables.

In a preferred embodiment of the method, the variables include the hollow fiber's outer and inner diameter, the number of fibers for the layer, the angle of coiling said fibers and the length of said fibers.

In a preferred embodiment, the diameter of the layer is between about 1 mm and about 460 mm.

In a preferred embodiment of the present invention, a fiber bundle comprises between 1 and 20 layers.

In one preferred embodiment, a fiber bundle comprising 3 layers is produced. It is anticipated that this bundle would be used in a filtration module for a pilot scale process.

In another preferred embodiment, a fiber bundle comprising 5 layers is produced.

In another preferred embodiment, multiple 5 layer fiber bundles (multi-mandrel units) are used in a single separation module.

It is anticipated that this multiple mandrel units would be used in a filtration module for a manufacturing scale process.

Preferably, one would use 7 such units in a process scale device for clarification of a lysate broth.

In a preferred embodiment, the fibers are arranged so as to maximize the packing density of the fiber bundle in a module in which the fibers would be used.

The present invention provides a method for producing a multi-layered coiled hollow fiber bundle that is directly scalable from a single layer coiled hollow fiber bundle, the bundles for use in separation modules, whereby the hollow fibers used have substantially identical composition, the method comprising determining a performance parameter from a single layer coiled hollow fiber bundle, the single layer coiled hollow fiber filter bundle including hollow fibers having substantially identical composition, when contained in a filtration module and subjected to a fluid of a certain velocity such that Dean vortices are created; calculating the needed value of the variables for each additional layer so each additional layer would produce a performance parameter substantially equivalent to that of the first layer when the ink bundle is part of a filtration module and subjected to the fluid of the certain velocity, and producing a multi-layered coiled hollow fiber bundle that incorporates the calculated variables.

In a preferred embodiment of the method, the variables include the number of fibers for the layer, the angle of coiling said fibers and the length of said fibers.

The present invention provides a method of manufacturing a multi-layered filtration module suitable to produce Dean vortices, the method comprising selecting a mandrel having a predetermined diameter and length; selecting a hollow fiber having a predetermined internal diameter (ID) and outer diameter (OD); selecting a number of the fibers to comprise the layer, selecting the winding angle with which the fibers would be wound around the mandrel; winding the fibers around the mandrel at the pre-selected angle so as to form a layer of coiled hollow fibers; and adjusting the length of said wound fibers to that of the mandrel so as to produce a first layer of said module having a certain performance parameter upon application of a measurable velocity of fluid having a measurable viscosity and a shear rate and adjusting the fiber lengths, number of fibers, and winding angle of subsequent layers so the certain performance parameter of each subsequent layer is substantially equivalent to that of the first layer.

In a preferred embodiment of the present invention, the fiber selected has an ID in the range of about 0.2 mm to about 4.0 mm. Preferably, the fiber selected has an ID in the range of about 1.0 mm to about 2.0 mm.

In a preferred embodiment of the present invention, the fiber selected has an OD in the range of about 0.3 mm to about 6.0 mm. Preferably the OD is the range of about 1.5 mm to about 2.5 mm.

In a preferred embodiment of the present invention, the number of fibers selected is between 1 and 200. Preferably, the number of fibers selected is between 6 and 53.

In a preferred embodiment of the present invention, the fiber length is between about 635 mm and about 2540 mm. Preferably, the fiber length is between about 1321 mm and about 889 mm.

In a preferred embodiment of the present invention, the diameter of the is mandrel is between about 3.2 mm and about 13 mm.

In a preferred embodiment of the present invention, the length of the module is between about 51 mm and about 1524 mm.

In a preferred embodiment, the winding angle (β) is between about 30° and about 89°. Preferably, the winding angle is between about 450 and about 75°. Even more preferably, the winding angle is between about 51° and about 62°. See Table II and FIG. 10 to determine the winding angle.

The present invention provides a single-layered coiled hollow fiber separation module designed to provide an estimated performance output when a fluid of a known shear rate and at a pre-determined velocity that creates Dean vortices is filtered there through, the module comprising a layer of coiled hollow fibers, the hollow fibers characterized by a set of variables including the hollow fiber's outer and inner diameter, the number of fibers, the angle of coiling said fibers and the length of said fibers; and a housing. Preferably, the single-layered coiled hollow fiber separation module also includes a mandrel around which the fibers will be coiled, the length and the diameter of the mandrel being known. Preferably, the number of fibers selected for each layer is contingent upon minimizing gaps between the fibers. Preferably the fibers are arranged so as to maximize the packing density.

With respect to operating filtration modules that incorporate the fiber bundles of the present invention, it is contemplated that the maximum trans-membrane pressure for such modules be between about 10 millibar to about 700 millibar for MF applications and between about 300 millibar to about 5500 millibar for UF applications.

Other operating conditions that are necessary for the present invention, for both UF and MF applications, the Reynolds number is greater than or equal to the critical Reynolds number which varies depending upon the ratio of the inner and outer radii of the curved channel, the Dean number greater than or equal to 13 and the flow of the fluid being less than or equal to 5 liters/ft$^2$ of membrane area.

In addition to the applications listed above, the following applications are considered appropriate for a module of the present invention independent of the type of filter that may have been historically appropriate for such application: mammalian cell protein clarification, mammalian cell protein perfusion, bacterial cell clarification and purification, lysate clarification, bacterial recombinant protein refold pool clarification, allantoic fluid (flu vaccine), recombinant protein inclusion body washing, diagnostic bead washing, wine clarification, red blood cell wash and concentration, vaccine clarification, gene therapy plasmid clarification and purification and transgenic milk protein clarification.

Experimental Section

Historically, the flow of fluids in conduits has been characterized by a dimensionless parameter called a Reynolds number (from the scientist Osborne Reynolds who investigated the flow of liquids in conduits). The Reynolds number (Re) is the product of the average velocity (u) of the fluid by the tube diameter (d) and the fluid density (ρ) divided by the absolute viscosity (μ) of the fluid as shown below in Equation 1:

$$Re = \frac{ud\rho}{\mu} \qquad \text{Equation 1}$$

Reynolds found that the flow properties of liquids changed when this dimensionless number exceeded a critical value. When the Reynolds number was approximately below 2000, the streamlines would be a smooth, laminar flow. Above that value, the streamline would be erratic due to the formation of eddies, leading to turbulent flow.

The liquid flowing in a curved conduit acquires an additional dimensionless parameter called a Dean number. The so-called Dean vortices are formed when the Dean number exceeds a critical value. The Dean number is expressed below in Equation 2:

$$De = \frac{ud\rho}{\mu} \sqrt{\frac{d}{d_c}} \qquad \text{Equation 2}$$

In this equation u is the average velocity of the fluid in the conduit, d the diameter of the tube, μ the absolute viscosity, ρ the density of the fluid and dc twice the radius of curvature of the conduit. See also, Boucher, D. F., Alves, G. E., *Chem. Eng. Progr.* 55 (9): 1959.

With respect to the critical Dean number, this equation is set forth in Equation 3:

$$De_{cr} = \frac{ud\rho}{\mu} \sqrt{\frac{d}{d_c}} \qquad \text{Equation 3}$$

As the present invention is directed to filtration modules in which Dean vortices occur, the mathematical model should correspond to that desire. As such, the Dean ratio (D), that is the ratio of the actual Dean number to the critical Dean number is of interest. See Equation 4 below:

$$D = \frac{De}{De_{cr}} \qquad \text{Equation 4}$$

As $De_{cr}$ is approximately 13, De must be greater than 13 for D to be equal or greater than 1. The subsequent mathematical models, therefore, require D being greater or equal to 1 or the performance parameter is not met.

With TFF, species retained by the membrane form a concentrated layer or cake on the surface of the membrane. However, the so-called back-transport of the accumulated species reduces the concentration of the retained species on the membrane surface and thereby mitigates the adverse effect of the concentrated layer on filter performance. The main mechanisms of back-transport are: 1) diffusion due to concentration difference; and 2) mass transfer due to the flow of the filtrate being tangential to the surface of the membrane. The magnitude of mass transfer is typically characterized by a parameter called mass transfer coefficient and is proportional to the shear rate at the surface of the membrane. The shear rate itself is defined in terms of the axial velocity gradient on the surface of the membrane. The performance of tangential flow filtration devices has been correlated to axial shear rate in the prior art. The higher the shear rate, the more back-transport and hence the more efficient the performance of the filter.

Figure 2:
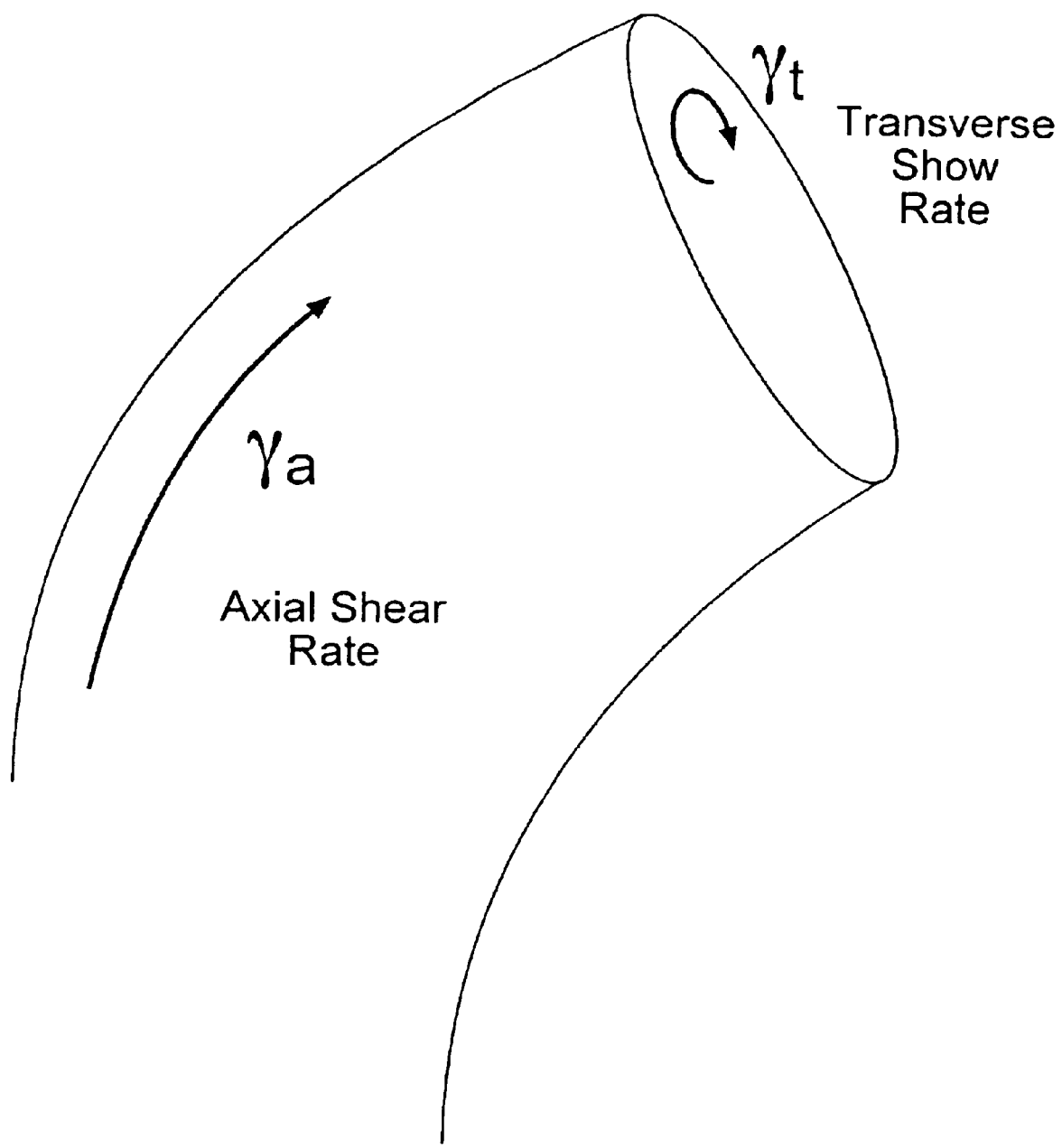
FIG. 2 is cartoon that illustrates the axial and transverse shear rates in a curved fluid channel.

Previous work (cited above) has shown that Dean vortices create a transverse shear rate in the secondary flow plane. This phenomenon increases the back-transport of retained species. The cartoon in FIG. 2 illustrates the axial and transverse shear rates. The Belfort patents disclose the use of the Dean vortices in coiled conduits to produce a filtration module that provided increased back-transport of retained species.

The net shear rate in a curved channel, a coiled channel being a subset thereof, can be expressed as the shear rate resultant from the axial and transverse components as provided in Equation 5:

$$\gamma_e = \sqrt{\gamma_a^2 + \gamma_t^2} \qquad \text{Equation 5}$$

$\gamma_e$ is the net shear rate or the effective shear rate, $\gamma_a$ is the axial shear rate and $\gamma_t$ is the transverse shear rate. We hypothesized that the magnitude of the transverse shear rate is proportional to the Dean number. Since both pressure drop (in terms of friction factors) and heat transfer have been correlated to Dean number, this is a reasonable assumption.

Therefore we can express the transverse shear rate in Equation 6:

$$\gamma_t = a(D-1)^b \qquad \text{Equation 6}$$

The relationship between the transverse shear rate and Dean number is found empirically by using Equation 5 to express $\gamma_t$ as provided in Equation 7:

$$\gamma_t = \sqrt{\gamma_e^2 - \gamma_a^2} \qquad \text{Equation 7}$$

The next step is to determine the axial shear rate and effective shear rate at a given Dean number. The axial shear rate can easily be calculated from the cross flow rate. To find the effective shear rate we used the following procedure. The flux of a TFF device is proportional to shear rate as provided in Equation 8:

$$J = a\gamma^b \qquad \text{Equation 8}$$

Experiments were performed with straight and coiled hollow fibers where the flux was measured as a function of shear rate. As expected the coiled fiber produced higher fluxes at the same axial shear rate, therefore the effective shear rate of the curved fiber is higher than its axial shear rate. The axial shear rate of a straight fiber that gives the same flux as a curved fiber is equal to the effective shear rate of the curved fiber. For example if an axial shear rate of 8000 s$^{-1}$ in the straight fiber resulted in the same flux as an axial shear rate of 4000 s$^{-1}$ in the curved fiber, we know that the effective shear rate in the curved fiber was 8000 s$^{-1}$. The increase in the effective shear rate is due to the transverse shear. Therefore the experiments generated the axial and effective shear rates as a function of the Dean number. We then calculated the transverse shear rate as a function of D by the use of Equation 6 and correlated the results in Equation 9:

$$\gamma_t = 294.25(D-1)^{1.058} \qquad \text{Equation 9}$$

The effective shear rate can now be expressed as:

$$\gamma_e = \sqrt{\gamma_a^2 (294.25)^2 (D-1)^{2.116}} \qquad \text{Equation 10}$$

These experiments further resulted in our formulating a correlation between performance and effective shear rate. This formula is expressed in Equation 11:

$$J = 0.66 \gamma_e^{0.708} \qquad \text{Equation 11}$$

By substituting the expression for effective shear rate into Equation 12, we produce the following equation:

$$J = 0.066 (\sqrt{\gamma_a^2 (294.25)^2 (D-1)^{2.116}})^{0.708} \qquad \text{Equation 12}$$

Therefore, the performance of a layer of a filter module of the present invention is proportional to:

$$\{\gamma^2 + 86583(D-1)^{2.116}\}^{0.354} \qquad \text{Equation 13}$$

Equation 13 sets forth the performance parameter that allows one to design algorithmically the fiber bundles of the present invention. Specifically, it provides one of ordinary skill in the art the ability to produce multi-layered filtration modules that can be directly scaled up.

It further provides a basis for designing a module that while not having an equivalent performance from one layer to the next, it can have layers that each "perform "substantially equivalently" to other layers within the module. This phrase means that the present invention considers and incorporates those design and manufacturing limitations that are not appreciated by an algorithm. For example, this algorithm does not take into consideration that the number of fibers per layer or N, needs to be an integer.

The discovery of Equation 13 and the variables that relate thereto has further enabled the inventors to devise an empirical approach to measuring performance of individual layers. Hence, it is an object of the present invention to design fiber bundles for use in multi-layered filtration modules. While such an empirical approach allows one to produce a module of the present invention, it would also be appropriate for measuring performance of an already constructed module.

With respect to manufacturing considerations, inventors recognize the performance parameter relies upon the adjustment of the winding angle for each layer, whether the module was designed algorithmically or not. Such adjustments would be costly in the production of an eleven-layer module. In such circumstances, the winding angle may be changed only three to four times. In the example set forth below, the winding angle is only altered once.

Accordingly, inventors foresee changing the winding angle for every group of three layers. So, for the present invention, a pilot scale module, preferably having only three layers in fiber bundle of the present invention, all of the fiber layers would preferably have the same winding angle.

In chemical engineering processes and for purposes of this invention, the phrase "scale up" includes activities related to transferring a process from a lab scale to a pilot scale or a pilot scale to a process scale (also known in the art as a manufacturing scale). A principal issue in scale up is insuring that the process developed on the smaller scale will be substantially equivalent when produced on a larger scale. If one can accurately predict the manufacturing or process scale performance based on lab or pilot scale performance with a minimum of trial and error experimentation, this is very valuable.

For purposes of this invention, the term "directly scaleable" relates to a scale up of a membrane process in separations. Preferably, the membrane process is used in the separation of so-called biotech products. Such products include, but are not limited to, recombinant deoxyribonucleic acid (DNA) molecules and derivatives, recombinant ribonucleic acid (RNA) molecules, ribozymes, recombinant enzymes, recombinant hormones, proteins and peptide.

Membrane processes are "directly scaled" up by increasing the surface area of the membrane to be used in manufacturing with respect to the volumes of fluid to be processed in the same ratio as that was used at the lab or pilot scale.

Linear scale up requires the use of certain parameters such as the use of the same path length, same velocity within the channel etc. Those of ordinary skill in the art would appreciate the additional parameters needed to linearly scale TFF.

The problem solved by the present invention is that Dean vortices are intrinsically non-linear since the performance of a Dean vortex-producing device is inversely proportional to the radius of curvature. For multi-layered devices, the outer fiber layers necessarily have a larger radius of curvature and therefore potentially lower performance than the inner layers. To resolve this problem we decided to take advantage of the dependency of the Dean number and shear on velocity. If the inner layer has a smaller radius of curvature than the outer layer, its performance can be made equal to the outer layer performance by using a lower velocity in the inner layer.

Figure 3:
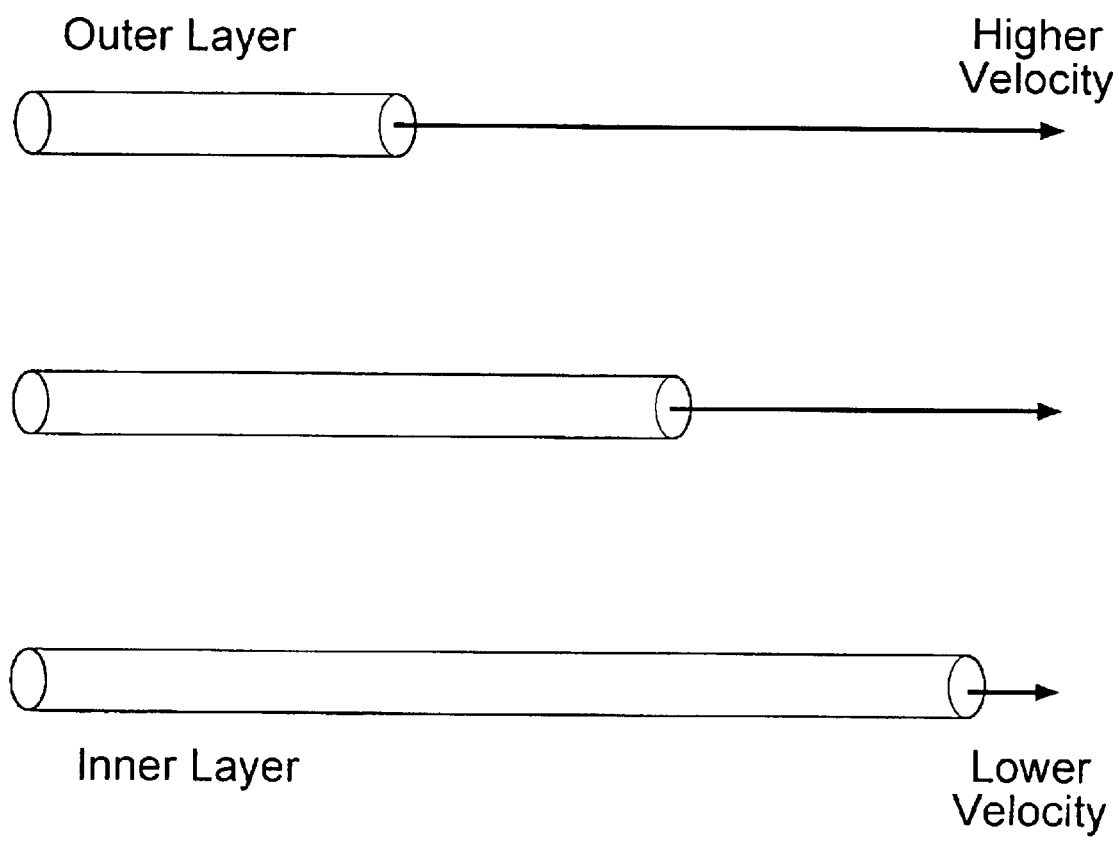
FIG. 3 is a cartoon that illustrates the different fluid velocities of the inner and outer layers of a multi-layered module of the present invention.

A preferable means of implementing this within the multi-layered modules of the present invention is through the use of longer fibers in the inner layers than the outer ones. Since all the fibers are exposed to the same pressure differential, the inner layers would then have a lower velocity. FIG. 3 illustrates this concept.

It is contemplated by the present invention that alternative means of adjusting the velocity of the fluid in a particular layer of hollow fibers will be employed. Use of hollow fibers that differ with respect to their diameter, assuming the length of the fibers were equivalent, or a combination of different diameter and length can be used. While inventors foresee such a method having higher manufacturing costs, a module produced thereby could have some performance benefits as well as be of a dimension that is suitable for a particular customer's process filter footprint.

The performance parameter of the present invention and the pressure drop-velocity relation was used to design the modules of the present invention with varying fiber lengths to produce a module where each fiber layer would have substantially equivalent performances. In this way the intrinsic non-linear effect of Dean vortices are made directly scaleable. Direct scale up with this newly designed module is provided by operating laboratory, pilot and manufacturing scale modules with the same feed channel pressure drop.

The empirical approach to designing a multi-layer hollow fiber bundle for use in filtration module results in each layer of such bundle having substantially equivalent performance is set forth below.

First, a rod or mandrel diameter (DRI) and a module length (L) for a single layer module are selected. Then, a number of fibers (N) for the first layer may be coiled around the mandrel. Such a number has a lower limit (1) and a practical upper limit as the fibers are wrapped around the mandrel so their outline forms a substantially concentric circle if looking at one end of said fiber bundle. Moreover, it is preferable if there is little if any spacing between the fibers, that is, the packing density is maximized.

After the N has been selected, the fiber bundle is coiled around a mandrel, it is potted in a manner known to those of skill in the art, this assembly inserted in the housing, which is preferably produced from polysulfone or related material, is secured within the housing and the housing is then capped with appropriate caps that provide ingress and egress of fluid.

A fluid of interest is then passed through the hollow fibers, at set flux (J) and a set feed channel pressure drop ($\Delta$Po) ($\Delta P_0$=Feed pressure–retentate pressure). Then the transmembrane pressure (TMP) is monitored. The filtration process is stopped when TN reaches a maximum allowable value. The capacity of the filter is calculated by dividing the volume of liquid filtered by the membrane surface area. The process is repeated for multiple layer fiber bundles having different N's. Next, plot capacity vs. N. See FIG. 4 for a sample of such a graph.

Figure 4:
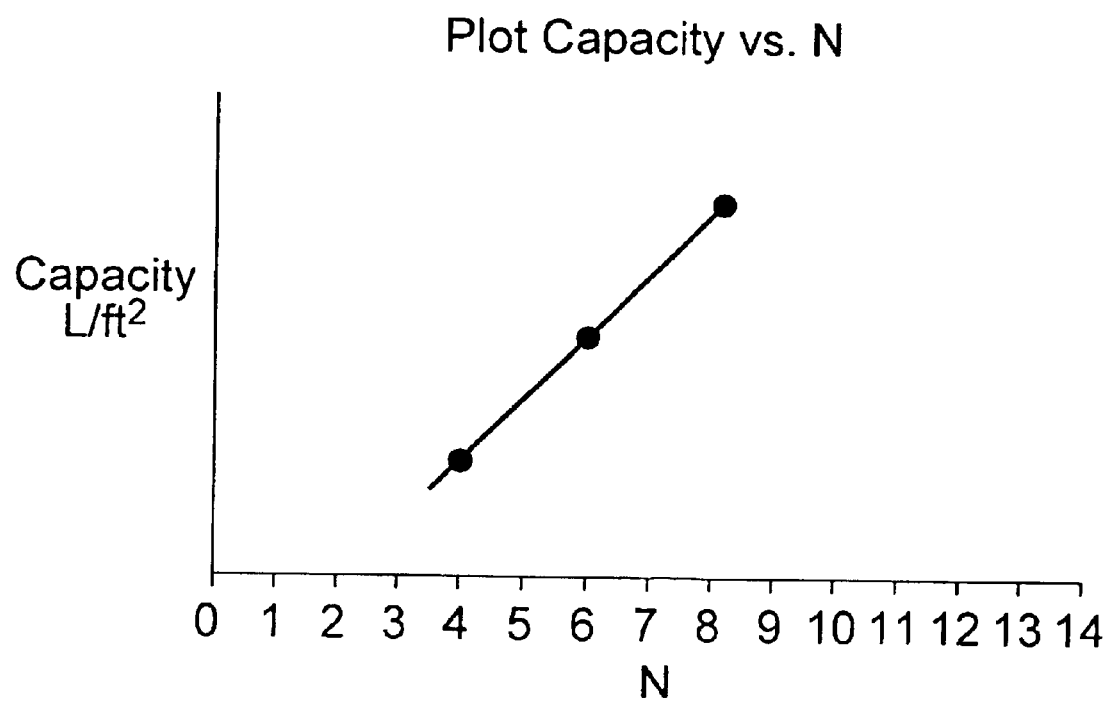
FIG. 4 provides a plot used to produce a module of the present invention.
Figure 5:
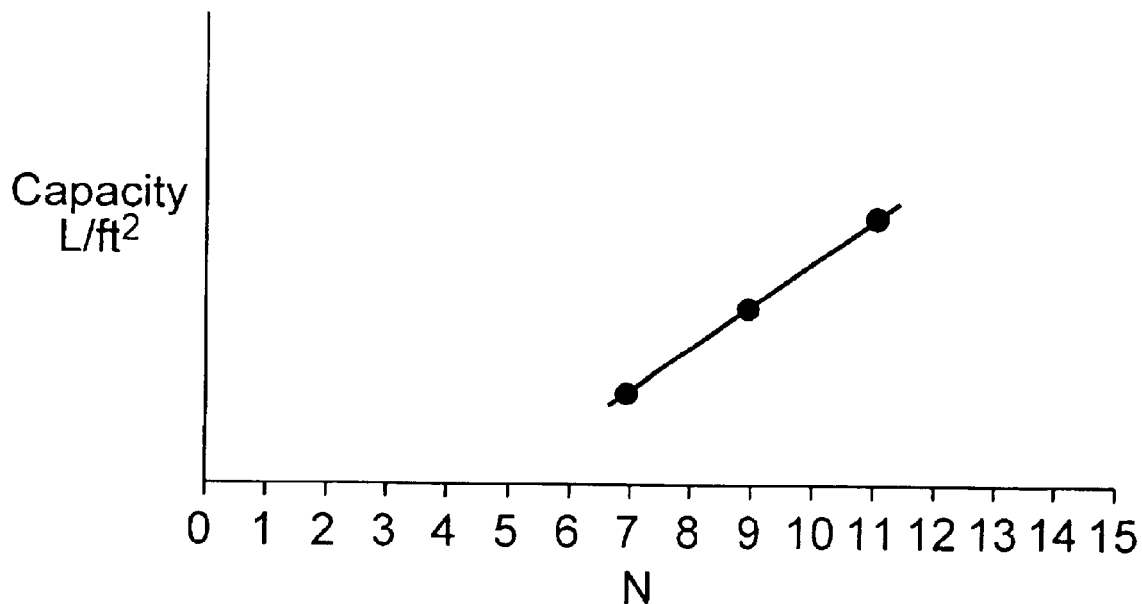
FIG. 5 provides a plot used to produce a module of the present invention.
Figure 6:
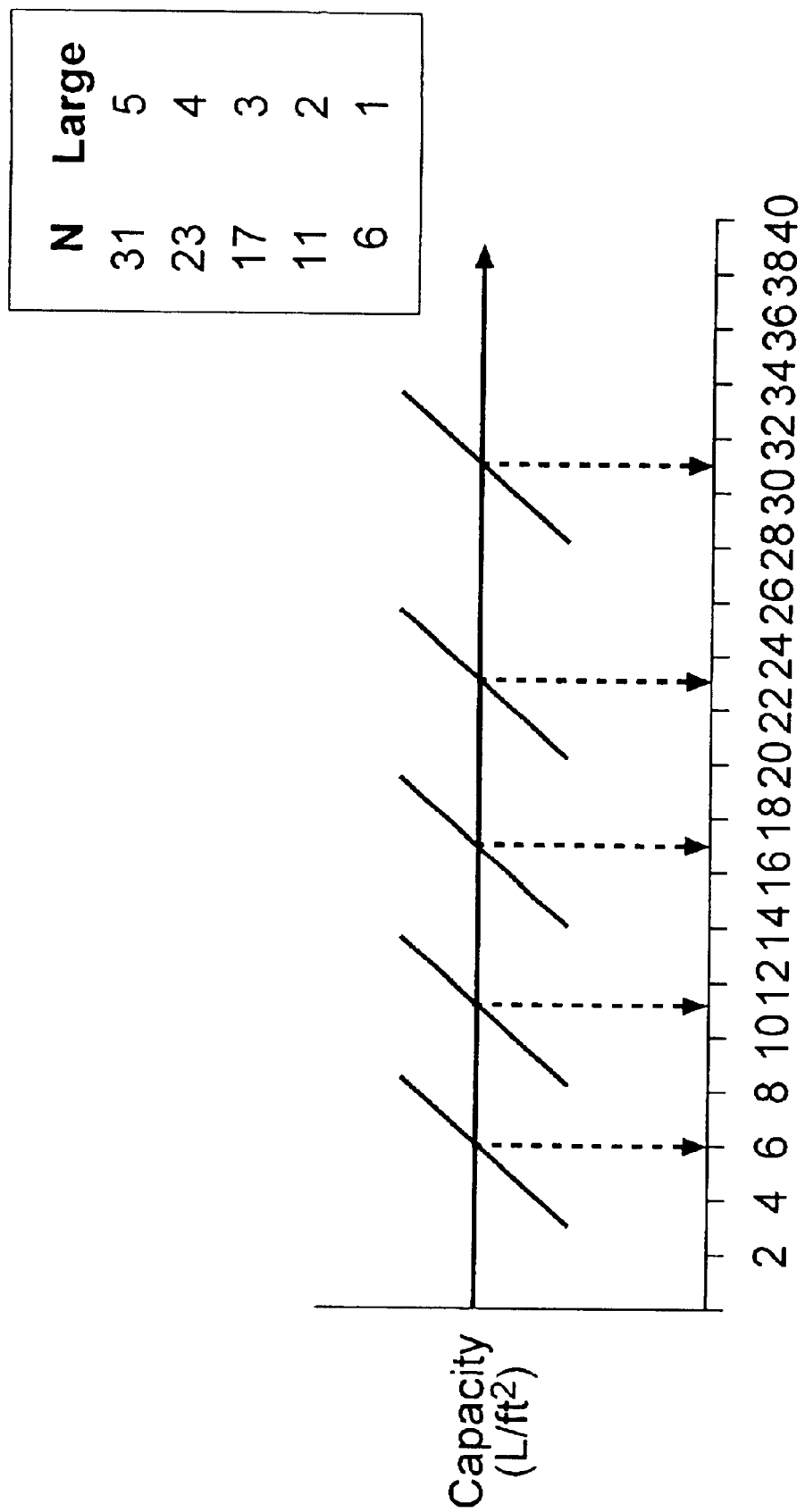
FIG. 6 provides a plot used to produce a module of the present invention.

FIG. 4 sets forth a variety of N in which the capacity of the membrane $1/ft^2$ is recorded. A second layer is then coiled around the mandrel in which a variety of N is used and is plotted. See FIG. 5. FIG. 6 provides where experimentation concerning 5 layers has been plotted. The module of interest would preferably be characterized by drawing a line substantially perpendicular to the y-axis and that intersects all of the curves for each layer. The line is drawn based on a feed flow per square meter of membrane area constraint at a given (P and length. The number of fibers for each layer would then be determined by the intersection of the constraint line with the curves for each layer. Such a module, empirically designed, would have layers that would perform substantially equivalently to each other.

Hollow fibers are well known to those of skill in the art and such persons would appreciate that the hollow fiber selected may depend, in part, upon the characteristics of the process stream to be filtered, the composition of the filtrate, solvent characteristics and the velocity of the process stream, to name a few. The parameters of choice for a hollow fiber for a filter module of the present invention can include, but are not limited to, the physical characteristics such as inner diameter, outer diameter, length, pore size and symmetry of the membrane.

Materials that would be typically used to manufacture hollow fibers for use in the present invention include various polyolefins such as polyethylene, in particular, ultra high molecular weight polyethylene, various polysulphones such as polyarylsulphones, polyethersulphone, nylon and other polyamides and polytetraflouroethylene ("PTFE") and other fluorinated polymers such as poly(tetraflouroethylene-co-perflouro (alkylvinylether)) ("FEP"), poly (tetraflouroethylene-co-perflouro (alykylvinylether)) PFA and MFA.

With respect to perflourinated thermoplastic resins selected for the hollow fibers, such fibers can made from resins such as HYFLON®620 resin available from Ausimont USA of Thorofare, New Jersey or TEFLON®FEP 100 resin available from E.I. duPont de Nemours of Wilmington, Del.

Such hollow fibers are also available from a number of sources including Millipore Corporation of Bedford, Mass. and A/G Technologies of Needham, Mass.

Corsep of Marlborough, MA produces a polyethersulfone membrane that is currently the best mode of practicing the present invention. Such fiber is a 1.3 mm ID, 2.0 mm OD fiber. Both a nominal 0.5 micron and a nominal 0.2 micron membrane was used. The membrane was substantially asymmetric and produced as taught by PCT/US89/04847. It's model number is provided below in Example IV.

Materials and methods of making hollow fibers are well known to one of ordinary skill in the art. With respect to the diameter of a hollow fiber, it can vary greatly depending upon the manufacturer and the polymer used. Typically the outer diameter of the hollow fiber is from about 0.3 mm to about 6.0 mm with a membrane wall (lumen) thickness of about 30 microns to about 600 microns, preferably from 250 to 350 microns. Preferably, the ratio of outside diameter to inside diameter of the fiber is typically 1.5:1 to about 2.5:1. The porosity is typically from about 25% to about 90%, more preferably from about 60% to about 80%.

Those of ordinary skill in the art can appreciate that the hollow fibers one would use for the present invention would be sufficiently pliable such that upon coiling they do not crack or otherwise loose their integrity.

Figure 7:
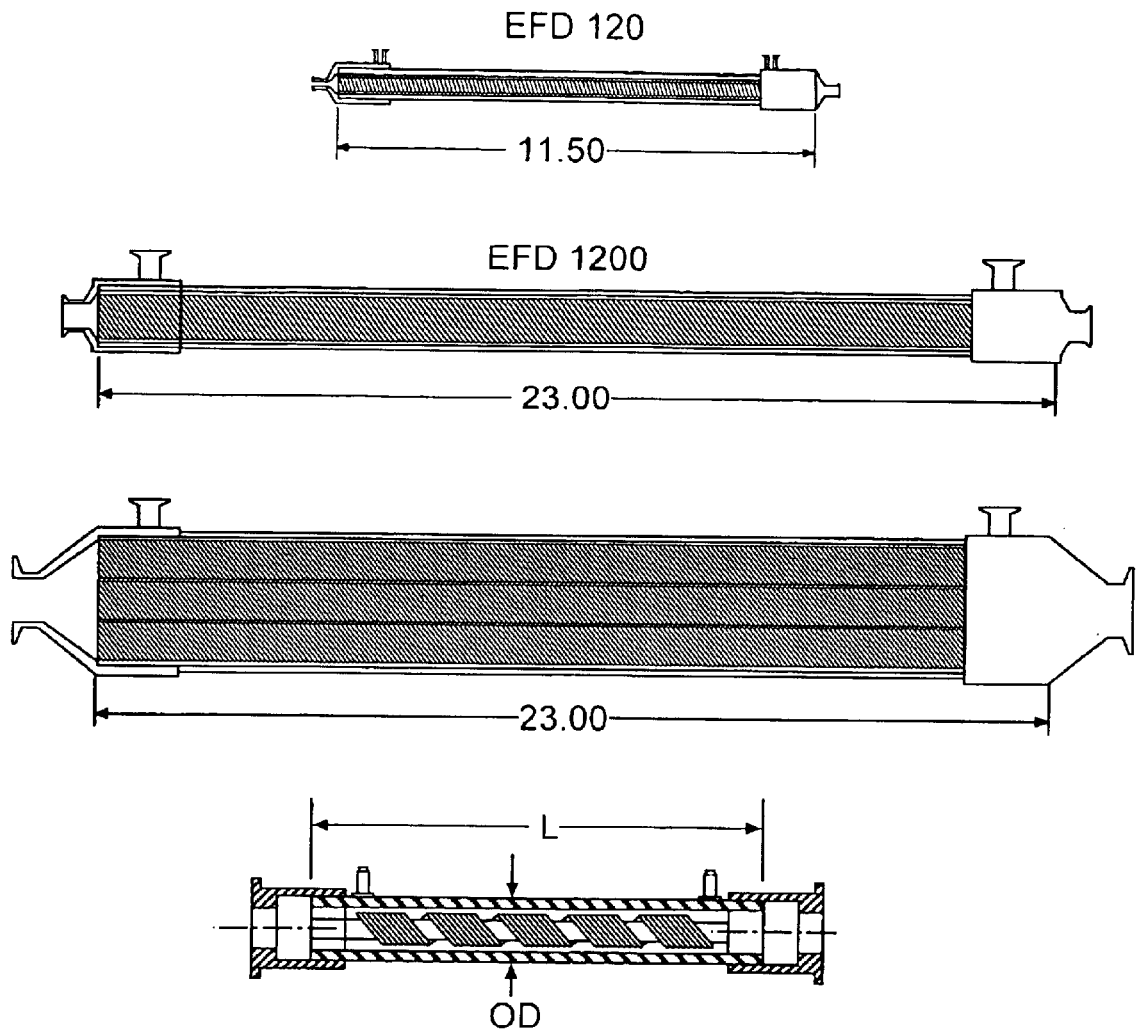
FIG. 7 provides an illustration of a variety of modules of the present invention.

With respect to producing a module of the present invention, FIG. 7 provides a variety of the modules of the present invention. Set forth in the table accompanying the Figure is design criteria one would consider for lab, pilot and process scale modules.

The following examples illustrate the present invention and are not intended to limit the same. A variety of hollow fibers of various lengths, diameters, structures and compositions are contemplated for producing a hollow fiber filter module of the present invention.

EXAMPLE I

The premise of the present invention is that by knowing the desired performance parameter, one can design multi-layered coiled hollow fiber bundles for use in filtration modules. This is because of the two variables in the performance parameter, the Dean number is contingent upon the physical construction of the curved hollow fiber, the fluid properties of the fluid of interest is filtered and the flow velocity.

Table I below provides the criteria for a module that contains the multi-layered fiber bundle that contains layers that perform substantially equivalently to each other.

The performance factor shown is based on a 3 psi lumen pressure drop (with a 1 cps fluid) and a fluid flow rate of <1.2 1 pm/sq.ft of membrane area.

| Layer Number | Fibers/ Layer | Area/ Layer (sq.m.) | Fiber Lenth (inch) | Winding angle (degrees) | Performance Factor of each layer |
| --- | --- | --- | --- | --- | --- |
| 1 | 6 | 0.0287 | 52.4 | 62 | 27.8 |
| 2 | 9 | 0.0422 | 51.3 | 62 | 26.2 |
| 3 | 15 | 0.0558 | 40.8 | 53 | 28.1 |
| 4 | 19 | 0.0694 | 40.0 | 53 | 27.6 |
| 5 | 23 | 0.0829 | 39.5 | 53 | 27.4 |
| 6 | 27 | 0.0964 | 39.1 | 53 | 27.2 |
| 7 | 31 | 0.0110 | 38.8 | 53 | 27.1 |
| 8 | 35 | 0.1235 | 38.6 | 53 | 27.0 |
| 9 | 39 | 0.1370 | 38.5 | 53 | 27.0 |
| 10 | 43 | 0.1505 | 38.3 | 53 | 27.0 |
| 11 | 47 | 0.1641 | 38.2 | 53 | 27.0 |

The advantages of this design are: a uniform performance factor, and only one winding angle change during the winding steps.

EXAMPLE II

Figure 8:
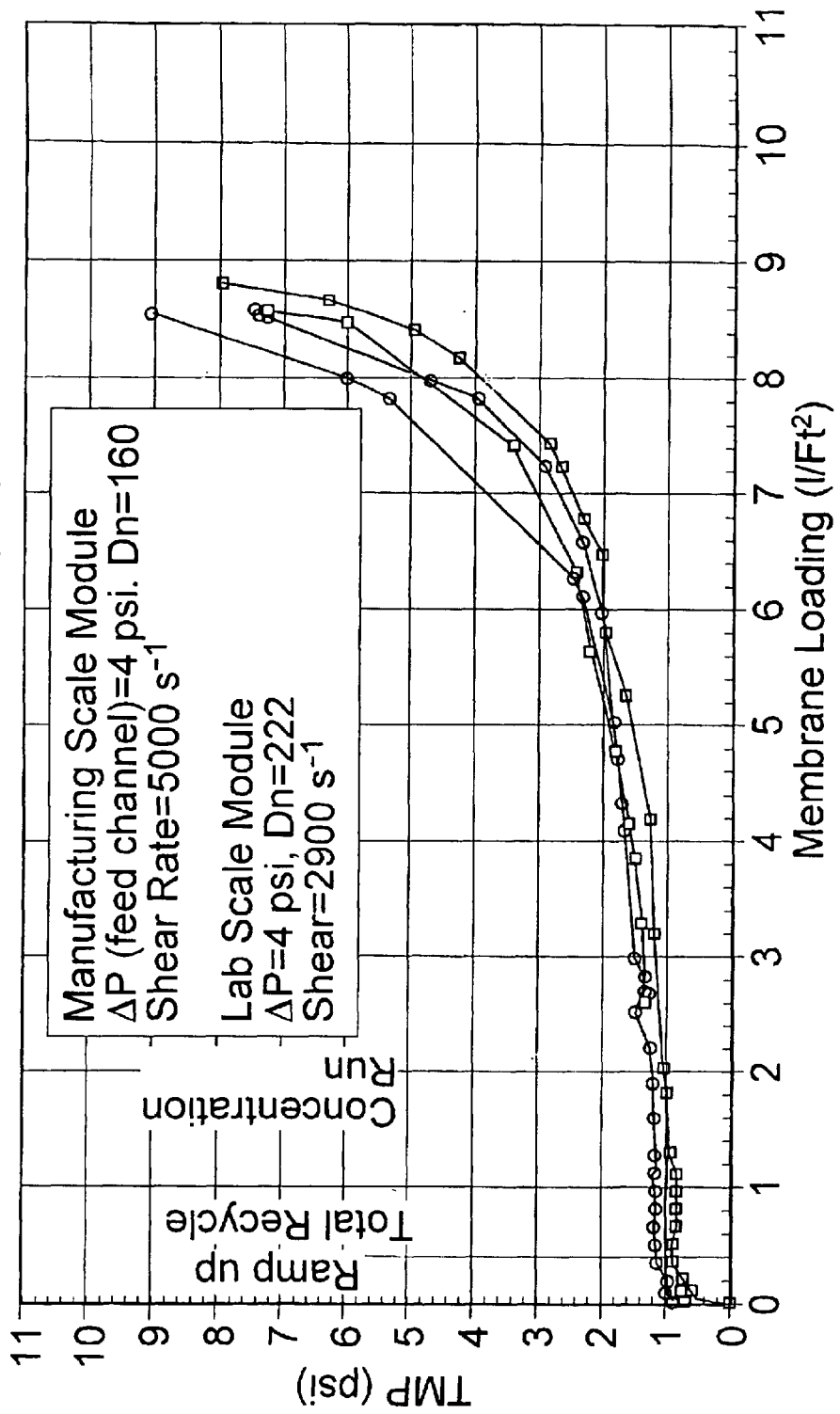
FIG. 8 provides a graph illustrating the performance of an eleven-layer filter of the present invention.

FIG. 8 provides experiments that demonstrate the scaling between a laboratory scale module (one layer) with that of a manufacturing scale module (eleven layers). The experiments were performed with a solution composed of 2% bovine serum albumin, 0.2% ribonucleic acid, and 0.5% dextran in 0.1 molar sodium acetate buffer of pH=5. During the experiments, the permeate flux was kept constant by the use of a permeate pump at a value of 20 lmh. The trans-membrane pressure was monitored. Typically when the trans-membrane pressure reaches a value of 5 psi the operation is stopped since the increase in the trans-membrane pressure indicates fouling and hence a low passage of the product molecule to the permeate side.

FIG. 8 demonstrates that the layers of the eleven-layer module perform substantially equivalently to that of the laboratory scale module. Hence, practicing the present invention can directly scale the single layer modules.

EXAMPLE III

Figure 10:
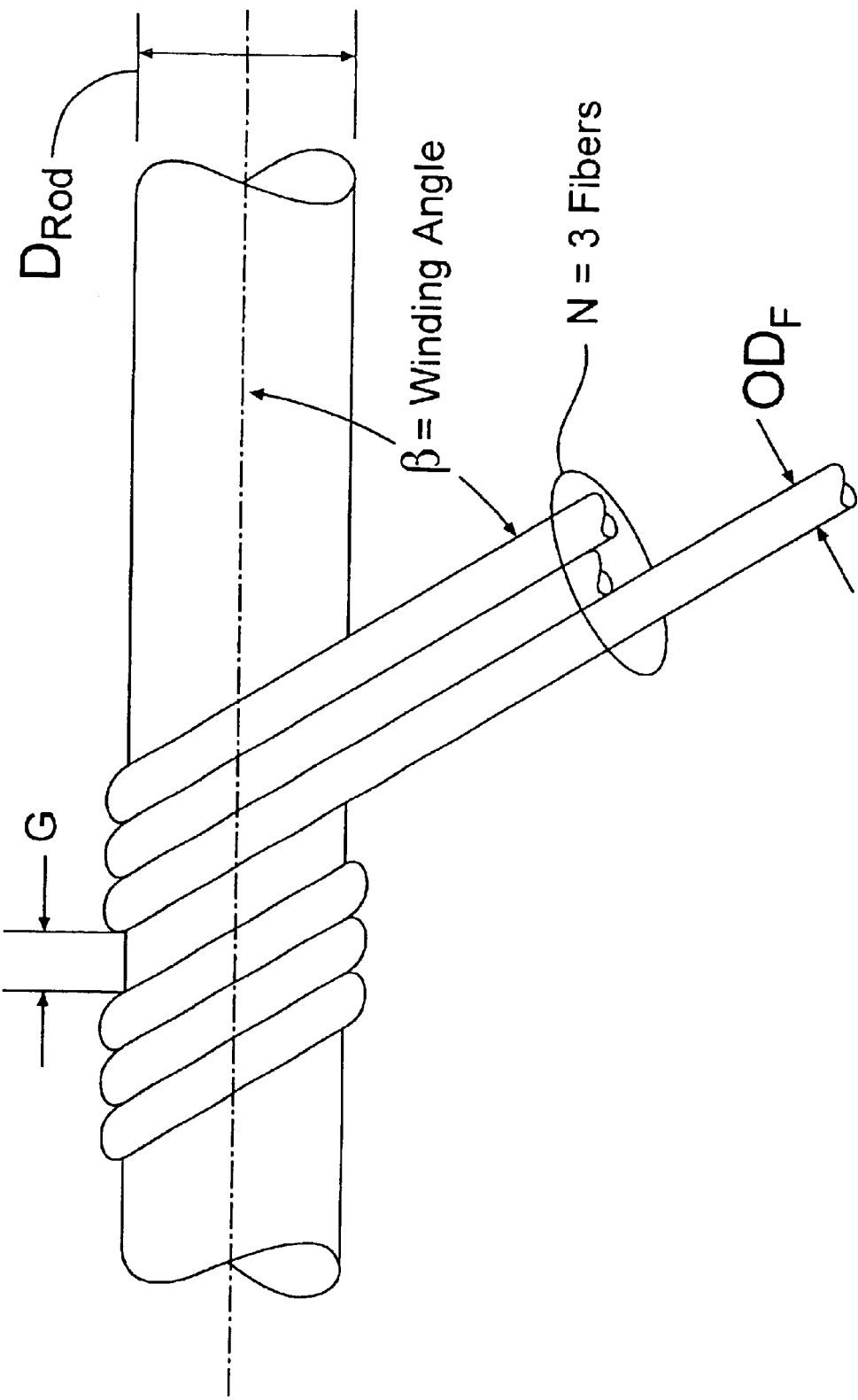
FIG. 10 provides a cartoon for use in defining the winding angle.

FIG. 10 and Table II provide further clarification about how to determine the winding angle of the present invention. As provided above, β represent the winding angle. The equation for determining the winding angle is set forth below:

$$\beta = \text{Arcsin}\left[\frac{-N + (N_2 \times N_3)}{N_4}\right]$$

TABLE II

| GENERAL CASE (WITH GAPS) | SPECIAL CASE (NO GAPS) |
| --- | --- |
| $N_1 = (N \ OD_F \ G)$ | $N_1 = (NOD_F)$ |
| $N_2 = \pi(D_{ROD} + OD_F)$ | $N_2 = \pi(D_{ROD} + OD_F)$ |
| $N_3 = \sqrt{N_2^2 + G^2 - (NOD_F)^2}$ | $N_3 = \sqrt{N_2^2 - N_1^2}$ |
| $N_4 = N_2^2 + G^2$ | $N_4 = N_2^2$ |

FIG. 10 provides how the equations in Table II are used to determine the winding angle. Note the difference in the formulas in the left and right hand columns. The right hand column reflects the desired winding angle: one that results in no gaps between the windings.

EXAMPLE IV

This example provides use of the algorithms of the present invention with a 1 layer module to predict the performance outputs of an 11 layer device. The results are provided in Table III, but this example will walk one through the variables and algorithms used to produce those numbers.

The algorithms are separated as inputs for layer 1, construction outputs and performance outputs. The inputs listed are the known characteristics of the first layer. Once determined after building the one layer module and running at a desired pressure and velocity, these variables are plugged into the algorithms to determine the construction outputs. Since the fibers are the same and the performance outputs need to remain equivalent, construction outputs suggest how the device is to be designed. Such outputs are algorithmically pre-determined as provided above. The construction outputs are used to design each successive layer. The performance outputs, for layers 3–11, are provided in Table III as well.

Below are the variables that are known for the one layer hollow fiber module and the process conditions. These variables are plugged into the construction outputs to determine the desired characteristics of the module to be built.

$L_{ROD}$=LENGTH OF ROD AND SHELL (inch)
$D_{ROD}$=OUTSIDE DIAMETER OF ROD (inches)
N=# OF FIBERS IN "GROUP"
G*=LINEAR GAP BETWEEN GROUPS (inch)
$ID_F$=INSIDE DIAMETER OF FIBER (mm)
$OD_F$=OUTSIDE DIAMETER OF FIBER (mm)
μ=DYNAMIC Viscosity (cps)
den=DENSITY
$L_\mu$=LENGTH OF Urethane (total for both ends)
Q=FLOW RATE FOR EACH LAYER FOR MULTI-LAYER DEVICE (1 pm)
X=LAYER#

Construction Outputs

β = winding angle (with horizontal)

$$= \arcsin\,(\sin\beta) \times \frac{180}{\pi}$$

FIG. 10 provides the support for how to determine the winding angle for the layer of interest.

$$\sin\beta = \frac{-(NOD_F G) + \pi(D_{ROD} + OD_F)\sqrt{\pi^2(D_{ROD} + OD_F)^2 + G^2 - (NOD_F)^2}}{\pi^2(D_{ROD} + OD_F)^2 + G^2}$$

P'=pitch of tightly wrapped group of fibers PLUS any gap between groups (P'=P+G)

Since pitch is related to the winding angle, we use the following to determine it. Note that if there is no gap between each wrap of the group of fibers, that G is 0.

$$P' = \frac{N(OD_F)}{\sin\beta} + G$$

Use of pitch allows one to determine the length of fiber one would need for each layer.

$\lambda$ = length of fiber required to make (1) turn around rod $$= \frac{L_F}{t} = 2\pi\sqrt{\left(\frac{D_{ROD} + OD_F}{2}\right)^2 + \left(\frac{P'}{2\pi}\right)^2}$$

$L_F$ = straight length of fiber along entire ROD $$= \frac{L_{ROD}\lambda}{P'}$$

You need to distinguish between the entire rod and the portion of the rod that is being used by the module. That is, the portion of the rod that is potted must be calculated and subtracted.

$L_e$=effective straight length of fiber between urethane seals (that is, the pots, one on each side. In Table III, the pots take up 2 inches of rod)

$$L_e = L_F - \left[L_F X \frac{L_\mu}{L_{ROD}}\right]$$

$T_T$ = total # turns over entire length of rod $$= L_F / \lambda$$

$T\mu$ = # of turns between urethane seals (between the inner edges of the pots)

$$= L_e / \lambda$$

$G_T$ = total amount of gap over entire rod length $$= (T_T - 1)xG$$

$A_X$ = cross sectional area $$= \frac{\pi(ID_F)^2}{4} xN$$

$A_m$ = effective membrane area $$= \pi(ID_F)xL_e xN$$

$D_C$ = mean coil diameter (no helix)

$$= D_{ROD} + OD_F = D_{ROD} + 2\left(\frac{OD_F}{2}\right)$$

$D_{C'}$ = modified coil diameter (modified to adjust for pitch of helix)

$$= \left[\left(\frac{P'}{\pi D_C}\right)^2 D_C\right] + D_C$$

Max#Fibers = the maximum # of fibers that can fit on a given ROD diameter with no overlap (use this formula to maximize packing density of hollow fibers)

$$= \frac{\pi(D_{ROD} + OD_F)}{OD_F}$$

Remember, since each layer has an actual rod diameter that is different from the previous diameter (because of the layering of the fibers), this has to be taken into consideration. Accordingly, the next equation includes the diameter of the rod as well as twice the diameter of the hollow fiber and the number of previous layers on the rod. Di is a "virtual rod" around which you are going to wind your current layer.

$$Di = \text{``}D_{ROD}\text{ Equivalent''} \text{ for layer ``}X\text{''} = [(X-1)*2OD_F] + D_{ROD}$$

For the equation below, A is the radius of the hollow fiber and $r'_C$ is the radius of curvature.

$$A/r'_c = \frac{ID_F}{D'_C}$$

Performance Outputs

These construction outputs allow you to determine your performance outputs for the layer "X".

dP(linear) = lumen press drop if fibers were straight $$= \frac{\mu L_F Q}{(ID_F)^4 N}$$

$R_e$ = Reynolds # $K_1$ = 21206

$$= \frac{K_1(den)Q}{\mu(ID_f)N}$$

VeL = fluid velocity through fiber bore $$= Q/A_x$$

Shear = fluid shear $$= \frac{8(VeL)}{ID_F}$$

$$D_N = R_E\sqrt{\frac{ID_F}{D'_C}} = \text{Dean\#}$$

dP(helical) = lumen pressure drop for helical fibers $$= (1 + 0.033(\log D_N)^4) \times dp(LIN)$$

Provided below is the loss in pressure from the two caps, retentate and feed, is quantified. dP(fits) varies from module to module be cause molded parts differ. So the dP(fits) for this is for molded EFD120 fittings (for both feed & retentate fittings).

$dP(\text{fits}) = \text{fitting losses} = 2.18 \times 10^{-5}(Q)^{1.79}$ $dP \text{ Module} = dp(\text{fibers}) + d^P(\text{fits})$

HELICAL or

LINEAR $Q_{F/A}$ = feed flow per membrane area

And our performance factor:

$F_{(SRP)} = .066 \left[ \pi^2 + 158500 \left( \left( \frac{D_N}{16.7} \right) - 1 \right)^{2.112} \right]^{0.354}$

TABLE III

| INPUTS layer 1 | | Q/layer |
|---|---|---|
| x = Layer # | 1 | (lpm) |
| Drod = dia. of rod (inch) | 0.25 | |
| Lrod = Length of rod (inch.) | 23 | 0.072 |
| | | 0.080 |
| N = Number of fibers per "group" | 3 | 0.088 |
| G* = Gap between fiber groups (inch.) | 0.010 | 0.096 |
| IDf = ID of Fiber (mm) | 1.35 | 0.104 |
| ODf = OD of Fiber (mm) | 2.00 | 0.08 |
| μ = fluid viscosity (cps) | 0 | 0.088 |
| den = fluid density (gms/com^3) | 0 | 0.096 |
| Lu. = total length of urethane (inch) | 2.00 | 0.104 |
| C nstruction Outputs | | |
| Beta (degrees) | 76.2 | |
| P;-pitch (inch) | 0.2532 | |
| Lambda = Lt/turn | 1.0634 | |
| Lf = length of fiber (inch) | 96.6 | |
| Le = ffect fiber length (inch) | 88.2 | |
| Tt = # of turns total | 90.8 | |
| Tu = # of turns between urethane | 82.9 | |
| Am = membrane area (sq. m.) | 0.0285 | |
| DIA = outside dia. of layer x (inch) | 0.407 | |
| a/rc* = IDf/Dc* | 0.153 | |
| Dc* = Dia. of curv. (helical tube) (m) | 0.00885 | |
| Di = Drod equiv. for layer x (inch) | 0.2500 | |

PERFORMANCE OUTPUTS

| Re | Vel. (cm/sec) | Shear (1/sec) | Dn Dean # | fiber only losses dP(hel) (psi) | Qf/A (lpm/ft. sq.) |
|---|---|---|---|---|---|
| 375 | 27.8 | 1,649 | 147 | 3.00 | 0.23 |
| 419 | 31.0 | 1,839 | 164 | 3.47 | 0.26 |
| 462 | 34.3 | 2,030 | 180 | 3.97 | 0.29 |
| 504 | 37.4 | 2,214 | 197 | 4.47 | 0.31 |
| 545 | 40.4 | 2,392 | 213 | 4.96 | 0.34 |
| 419 | 31.0 | 1,839 | 164 | 3.47 | 0.26 |
| 462 | 34.3 | 2,030 | 180 | 3.97 | 0.29 |
| 504 | 37.4 | 2,214 | 197 | 4.46 | 0.31 |
| 545 | 40.4 | 2,392 | 213 | 4.96 | 0.34 |

| | |
|---|---|
| Module # | 11-layer; 1/2 length 102797-1 |
| Fiber Mfg. | CoreSep |
| Fiber Lot # | 070197x313 |
| IPA B. Pt (psi) | 8 |
| Hw (lmh/psi) | 3000 |

EXAMPLE V

The owner of the present application is concurrently filing an U.S. Provisional Patent Application concerning an improved method of potting hollow fibers. This application is enclosed herewith in its substantial entirety.

The improved method of potting comprises introducing epoxy into an internal region of a hollow fiber bundle and then introducing epoxy into a region external to said first point of introduction. The new method was needed as the Belfort patent; the principal reference on coiled hollow fiber modules, made no mention of potting the fiber bundles of multi-layered devices.

For potting straight hollow fiber filtration devices, epoxy is used to pot or bond the fibers together. Such fibers are potted by injecting epoxy around the outer layer of fibers. While this method is appropriate for straight hollow fibers, it was inadequate for the multi-layered coiled hollow fiber devices produced by the inventor's colleagues. See U.S. Provisional Patent Application No. 60/112,647 filed Dec. 17, 1998.

While use of a mandrel was preferred to produce these the multi-layered coiled hollow fiber devices, the mandrel interfered with the potting. With the prior art method, the epoxy was not sealing around all of the fibers, especially the fibers positioned at or near the mandrel. The tightly wound, multiple layers of fibers formed a barrier to the epoxy penetrating the inner layers of fibers. Since the fibers did not pot properly, the performance of the module did not match the performance outputs predicted by the algorithms.

This potting method involves a two step potting process that includes injecting epoxy through a central tube and onto the inner layers of a multi-layered fiber bundle. By first potting through the central tube, the epoxy distributes evenly throughout these fibers. The second step is to pot around the outer layer of the fiber bundle to finish the process.

Millipore is spiral winding fibers around a central, hollow tube. This improved potting method is a potting technique that is preferable for potting spiral wound hollow fibers. This potting technique would also be used to pot the ends of straight hollow fibers, using a tube only the length of fibers needed to pot.

Figure 11:
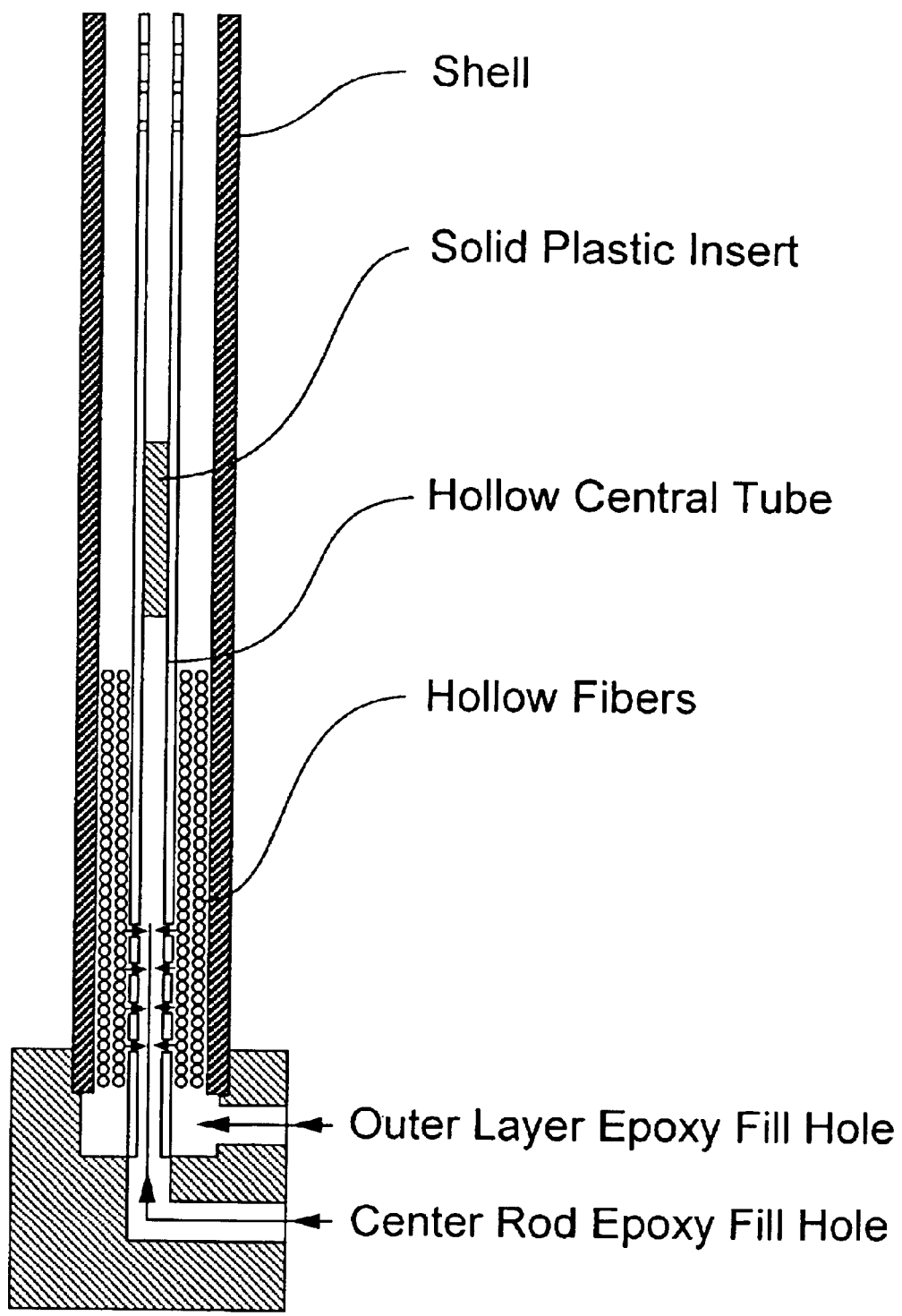
FIG. 11 provides a cross section of devices used to pot the modules of the present invention.

FIG. 11 illustrates the present invention. The shell or housing and the fiber-wrapped mandrel are placed on a preformed block that has an outer layer epoxy fill hole and a center rod epoxy fill hole. The hollow central tube includes a plastic inset and through holes in fluid communication with the inner layers of hollow fibers. Prior to inserting the hollow fiber bundle into the shell, the end to be potted is dunked into glycerin. The glycerin wets the fibers such that the epoxy does not wick into the lumens of the fibers or up the side of the fiber. Use of the glycerin insures the pot is reproducible.

The structure is then inserted into the preformed block and the center rod epoxy fill hole is then filled with enough epoxy to force epoxy through the through holes and into the fiber bundle to form a pot of predetermined height. The outer layer epoxy fill hole is then filled with epoxy to that same height.

EXAMPLE VI

Figure 9:
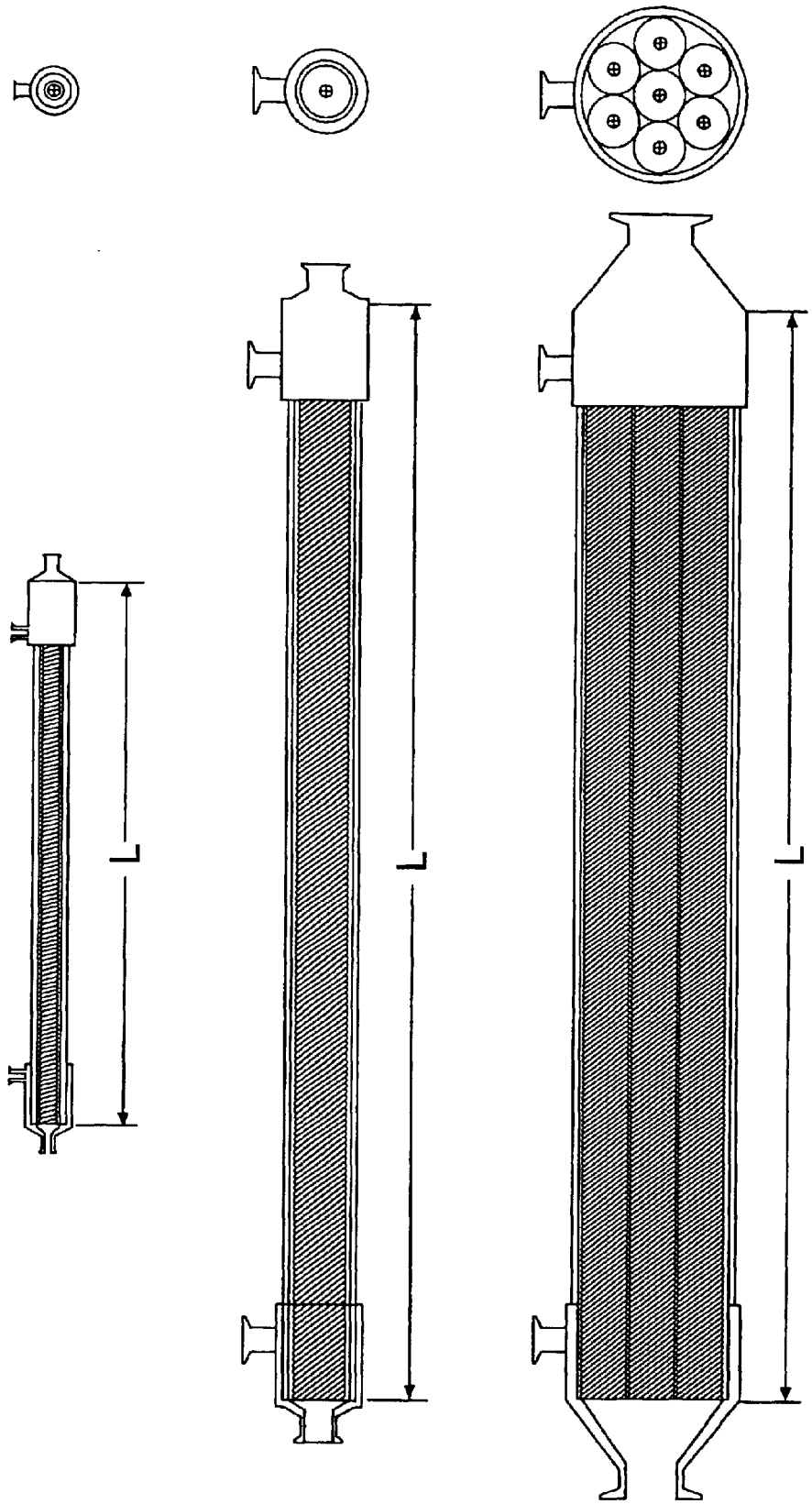
FIG. 9 provides an illustration of a module of the present invention comprising a plurality of mandrel units.

This example provides a five-layer module of the present invention, see FIG. 9 and Table IV. This module used an experimental polyethersulfone hollow fiber with many of the same attributes of the CoreSep membrane in Example IV. However, the membrane cannot survive autoclaving so it remains an experimental membrane.

Producing 5 layer modules and then combining numerous 5 layer modules into one housing has been determined to be most desirable for the process scale module. Indeed, use of a single 5 layer module for pilot batches make scalability very easy.

TABLE IV

| | | | | | | | | | | | | | | | |
|---|---|---|---|---|---|---|---|---|---|---|---|---|---|---|---|
| Lrod (inch) | | 0.25 | Module # | | 0 | | | 5-layer full length | | | | | | | |
| | | 23.75 | Fiber Mfr. | | 0 | | | | | | | | | | |
| IDf (mm) | | 1.17 | Fiber Lot # | | 5410-42 | | | side vel. (inch/sec), axiz #2 = 0.250 | | | | | | | |
| ODf (mm) | | 1.95 | Hw (lmh/psi) | | 0 | | | | | | | | | | |
| Lu (inch) | | 2.00 | IPA B. Pt. | | 10 psi | | | | | | | | | | |

| "X" Layer # | Area/layer (sq. m.) | Culm. Area (sq. m.) | Culm. Area (sq. m.) | Le (in) | N | Culm. N | Lf (ln) | winding angle Beta | Lambda Li/turn | pitch* (inch) | Tu # of turns | a/Rc IDf/Dc* | Outside Dia. (inch) | Initial mat length (inch) | axis #*1 spindle vel (rev/sec) |
|---|---|---|---|---|---|---|---|---|---|---|---|---|---|---|---|
| 1 | 0.0257 | 0.0257 | 0.28 | 45.8 | 6 | 6 | 50.0 | 62 | 1.19 | 0.56 | 38.8 | 0.107 | 0.42 | 58.4 | 0.394 |
| 2 | 0.0383 | 0.0640 | 0.69 | 45.6 | 9 | 15 | 49.8 | 61 | 1.78 | 0.85 | 25.6 | 0.071 | 0.58 | 58.0 | 0.244 |
| 3 | 0.051 | 0.1150 | 1.24 | 38.4 | 15 | 30 | 39.8 | 53 | 2.60 | 1.55 | 14.0 | 0.045 | 0.75 | 46.8 | 0.111 |
| 4 | 0.0637 | 0.1786 | 1.92 | 35.9 | 19 | 49 | 39.2 | 53 | 3.27 | 1.98 | 11.0 | 0.035 | 0.91 | 46.1 | 0.076 |
| 5 | 0.0763 | 0.2549 | 2.74 | 35.5 | 23 | 72 | 38.8 | 52 | 3.95 | 2.42 | 9.0 | 0.029 | 1.08 | 45.7 | 0.053 |
| 7 sub mod. | | 1.7845 | 19.20 | | | 288 | | | | | | | | | |

What is claimed is:

1. A method for producing a multi-layered coiled hollow fiber bundle, the method comprising the steps of:
   (a) coiling a hollow fiber around a mandrel to form a first layer thereon, and
   (b) coiling said hollow fiber around said mandrel over said first layer to form a second layer thereon;
   wherein the coiling in step (a), the coiling in step (b), and the hollow fiber satisfy predetermined variables, such that when fluid flows through said hollow fiber at a predetermined velocity, Dean Vortices are generated in the hollow fiber in both said first and second layers, and both said first and second layers perform substantially equivalently along at least one predetermined performance parameter; and
   wherein said predetermined variables comprise the outer and inner diameter of said hollow fiber, the length of said hollow fiber, and the angle of winding said hollow fiber in both steps (a) and (b).

2. The method of claim 1, wherein said inner diameter of said hollow fiber is in the range of about 1.0 mm to about 2.0 mm, said outer diameter of said hollow fiber is in the range of about 0.3 mm to about 6.0 mm; and the length of said hollow fiber is between about 635 mm and about 2540 mm.

3. The method of claim 2, wherein said mandrel has a diameter of between about 3.2 mm and about 13 mm.

4. The method of claim 3, wherein the angle of winding said hollow fiber in both step (a) and step (b) is between about 30 and about 89 degrees.

* * * * *